(12) United States Patent
Weber et al.

(10) Patent No.: US 10,554,102 B2
(45) Date of Patent: Feb. 4, 2020

(54) METHOD FOR OPERATING A LONG STATOR LINEAR MOTOR

(71) Applicant: B&R INDUSTRIAL AUTOMATION GMBH, Eggelsberg (AT)

(72) Inventors: Andreas Weber, Salzburg (AT); Joachim Weissbacher, Bergheim (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 346 days.

(21) Appl. No.: 15/608,081

(22) Filed: May 30, 2017

(65) Prior Publication Data
US 2017/0346379 A1 Nov. 30, 2017

(30) Foreign Application Priority Data

May 31, 2016 (AT) .............................. A 50495/2016

(51) Int. Cl.
*H02K 11/30* (2016.01)
*B60L 13/10* (2006.01)
(Continued)

(52) U.S. Cl.
CPC .............. *H02K 11/30* (2016.01); *B60L 13/10* (2013.01); *B60L 15/005* (2013.01); *B60L 15/38* (2013.01);
(Continued)

(58) Field of Classification Search
CPC ...... H02K 41/031; H02K 11/30; H02K 41/02; H02K 41/03; B60L 13/10; B60L 15/005; B60L 15/38; B65G 54/02
See application file for complete search history.

(56) References Cited

U.S. PATENT DOCUMENTS

| 6,101,952 A | 8/2000 | Thornton et al. |
| 6,208,497 B1 * | 3/2001 | Seale ........................ F01L 9/04 361/154 |

(Continued)

FOREIGN PATENT DOCUMENTS

| DE | 1963505 | 7/1970 |
| DE | 10 2011 075 174 | 11/2012 |

(Continued)

OTHER PUBLICATIONS

EP Search Report issued in EP 17 17 2543.
(Continued)

*Primary Examiner* — Mohamad A Musleh
(74) *Attorney, Agent, or Firm* — Greenblum & Bernstein, P.L.C.

(57) ABSTRACT

In order to improve the adaptation of a long stator linear motor to requirements or conditions of individual transport units or of the transport track it is foreseen, that the control variables (StG) of a driving coil (7, 8) of long stator linear motor are superimposed with an excitation signal (AS) with a predetermined frequency band, wherein actual variables (IG) of the driving coil control are determined, from the control variables (StGAS) superimposed with the excitation signal (AS) and from the determined actual variables (IG) a frequency response is determined and from the frequency response the control parameters (RP) for this transport unit (Tx) are determined and the transport unit (Tx) is controlled using these determined control parameters (RP) for movement along the transport track.

19 Claims, 6 Drawing Sheets

(51) Int. Cl.
*B60L 15/00* (2006.01)
*B60L 15/38* (2006.01)
*B65G 54/02* (2006.01)
*H02K 41/03* (2006.01)
*H02K 41/02* (2006.01)

(52) U.S. Cl.
CPC ........... *B65G 54/02* (2013.01); *H02K 41/031* (2013.01); *H02K 41/02* (2013.01); *H02K 41/03* (2013.01)

(56) References Cited

U.S. PATENT DOCUMENTS

| | | |
|---|---|---|
| 6,876,107 B2 | 4/2005 | Jacobs |
| 9,051,132 B2 | 6/2015 | Van De Loecht et al. |
| 9,617,089 B2 | 4/2017 | Josefowitz et al. |
| 2002/0022903 A1 | 2/2002 | Krah |
| 2008/0115372 A1 | 5/2008 | Vogel et al. |
| 2013/0074724 A1 | 3/2013 | King et al. |
| 2013/0313072 A1 | 11/2013 | Heinrich |
| 2014/0097783 A1 | 4/2014 | Hara |
| 2015/0008768 A1 | 1/2015 | Achterberg et al. |
| 2015/0083018 A1 | 3/2015 | Clark et al. |
| 2015/0303841 A1 | 10/2015 | Suzuki et al. |

FOREIGN PATENT DOCUMENTS

| | | |
|---|---|---|
| DE | 10 2012 025 326 | 6/2014 |
| EP | 1 180 733 | 2/2002 |
| GB | 1 247 257 | 9/1971 |
| WO | 2004/103792 | 12/2004 |
| WO | 2012/107431 | 8/2012 |
| WO | 2013/143783 | 10/2013 |
| WO | 2015/036302 | 3/2015 |
| WO | 2015/042409 | 3/2015 |

OTHER PUBLICATIONS

Related U.S. Appl. No. 15/608,095, filed May 30, 2017.
Austria Search Report conducted in counterpart Austria Appln. No. A 50495/2016 (dated Jun. 20, 2017).
Austria Search Report conducted in related Austria Appln. No. A 50494/2016 (dated Jun. 20, 2017).

* cited by examiner

METHOD FOR OPERATING A LONG STATOR LINEAR MOTOR

CROSS-REFERENCE TO RELATED APPLICATIONS

The present application claims priority under 35 U.S.C. § 119(a) of Austria Patent Application No. A50495/2016 filed May 31, 2016, the disclosure of which is expressly incorporated by reference herein in its entirety.

BACKGROUND OF THE INVENTION

1. Field of the Invention

The present invention refers to a method for operating a long stator linear motor with a transport track along which a plurality of driving coils are sequentially arranged and with at least one transport unit, which is moved along the transport track, wherein each driving coil is controlled by a driving coil controller with corresponding control parameters, in that the driving coil controllers set control variables for the driving coils interacting with the transport unit.

2. Discussion of Background Information

In almost every modern production plant it is required to move parts or components also over long transport distances, by means of transport apparatus, between individual manipulation or production stations. To this end, various transport or conveyor devices are known. Frequently continuous conveyors are used in different embodiments. Conventional continuous conveyors are conveyor belts in various embodiments, in which a rotational movement of an electric drive is transformed in a linear movement of the conveyor belt. With this kind of conventional continuous conveyors flexibility is gravely limited, in particular an individual transport of individual transport units is not possible. In order to solve this problem and comply with requirements of modern flexible transport apparatus, the use of so called long stator linear motors (LLM) as a substitute for conventional continuous conveyors is spreading.

In a long stator linear motor a plurality of electric driving coils, which form the stator, are disposed along a transport track. On a transport unit a number of excitation magnets, either permanent magnets or electric coils or short-circuit windings, are arranged, which interact with the driving coils of the stator. The long stator linear motor may be a synchronous machine, both self-excited or externally excited, or an asynchronous machine. By controlling the individual driving coils in the area of the transport unit for controlling the magnetic flux, a propulsion force is generated on the transport unit and the transport unit may therefore be moved along the transport track. It is possible to position along the transport track a plurality of transport units, whose movements may be individually and independently controlled, in that only the driving coils are activated, which are positioned in the area of the individual transport units. A long stator linear motor is in particular characterized by an improved and more flexible use in the entire operating range of movement (speed, acceleration), an individual adjustment/control of the transport units along the transport track, an improved energy use, the reduction of maintenance costs due to lower number of wearing parts, a simple replacement of the transport units, an efficient monitoring and error detection and an optimization of the product flow along the transport track. Examples of such long stator linear motors may be obtained from WO 2013/143783 A1, U.S. Pat. No. 6,876,107 B2, US 2013/0074724 A1 or WO 2004/103792 A1.

In US 2013/0074724 A1 and WO 2004/103792 A1 the driving coils of stator are positioned on the upper side of the transport track. The permanent magnets are positioned on the lower side of the transport units. In WO 2013/143783 A1 and U.S. Pat. No. 6,876,107 B2 the permanent magnets are positioned on both sides of the centrally disposed driving coils, whereby the permanent magnets surround the stator of the long stator linear motor and the driving coils interact with the permanent magnets which are disposed on both sides.

The guidance of the transport units along the transport tracks takes place either mechanically for instance by means of the guide rollers, for example described in WO 2013/143783A1 or in U.S. Pat. No. 6,876,107 B2, or by magnetic guides, as for instance described in WO 2004/103792A1. Combinations of the magnetic and mechanical guidance are also possible. In case of a magnetic guidance guide magnets may be provided on both sides on the transport units, wherein the magnets interact with guiding rods arranged on the transport track opposed to the guide magnets. The guiding rods form a magnetic yoke, which closes the magnetic circuit of the guiding magnets. The magnetic guiding circuits which are therefore formed counteract a lateral movement of the transport units whereby the transport units are laterally guided. A similar magnetic guiding system is also disclosed in U.S. Pat. No. 6,101,952 A.

In many transport apparatus transfer positions, for instance provided by switches, in order to allow for complex and intelligent track planning or track design of the transport apparatus. Up to now, these transfer positions are frequently achieved by additional mechanical triggering units. An example is provided in US 2013/0074724 A1 as a mechanically triggered switch by moving deviating arms or a rotating plate. Transport apparatus are also already known, wherein additional electric auxiliary coils are used, in order to provide a switch activation. In U.S. Pat. No. 6,101,952 A the auxiliary coils are for example disposed on the magnetic yoke of the magnetic guiding circuit, whereas the auxiliary coils in US 2013/0074724 A1 are laterally positioned on the transport track. In DE 1 963 505 A1, WO 2015/036302 A1 and WO 2015/042409 A1 magnetically activated switches of a long stator linear motor are described, which operate without additional auxiliary coils.

A long stator linear motor has high requirements regarding the control of movement of transport units. To this end, along the transport track usually a plurality of controllers are disposed, which control the stator currents of driving coils, in order to move the transport units as required along the transport track. For moving the transport units it is necessary that each driving coil is separately controlled, in order to ensure a smooth, controlled and stable movement of the transport units along the transport track. However on the transport track a multitude of transport units are moving, whereby through different driving coils different transport units are controlled. However the transport units moving along the transport track may have different properties. For example, the transport units may be differently loaded, may have different wear conditions, may cause different guiding forces due to manufacturing imperfections, may cause different friction forces, etc. It is also conceivable, that transport units having different designs or different sizes are moving along the transport track. All these factors influence the control of transport units.

However, since the control of driving coils has to operate in a stable and reliable way for all transport units, a conservative control strategy has been implemented up till now. This kind of control does however reduce the dynamic, whereby rapid control interventions, for example a brisk speed variation of transport unit, are limited.

The individual transport units are also subject to different wear, which makes the maintenance of the transport units or the long stator linear motor complicated. The maintenance or even the replacement of all transport units at predetermined time intervals is in fact possible and simple, but also time consuming and costly, since transport units may possibly be serviced or replaced, which do not really require such interventions. On the other hand a higher wear may increase the resistance to movement of individual transport units due to increasing friction between the transport units and the guide. This would cause higher performance losses, since the driving power of the transport units has to be increased. Not in the least, the current wear condition of the transport unit influences also its control.

SUMMARY OF THE EMBODIMENTS

Embodiments of the present invention therefore better adapt the operation of a long stator linear motor to the requirements or the conditions of the individual transport units or transport track.

These embodiments are achieved, according to the invention by superimposing an excitation signal with a predetermined frequency band on the control variables of a driving coil, wherein actual values of the driving coil control are determined and from the control variables superimposed with the excitation signal and from the determined actual values a frequency response is determined, wherein from the frequency response the control parameters for said transport unit are determined and the transport unit is controlled using these determined control parameters for movement along the transport track. This allows a simple determination of optimized control parameters of the driving coil controller, which in turn allows for faster control interventions.

In a preferred embodiment, the control parameters are varied, in order to set a desired predetermined property of the frequency response. A frequency response may be easily determined, which in turn allows a simple determination of control parameters.

It may be advantageous, in this case, to use the same control parameters for different transport units, or to use different control parameters for different transport units or to determine different control parameters for different transport section of the control system or to determine different control parameters for different loading conditions of a transport unit. In this way the method according to the invention may be very flexibly used according to requirements of the respective application.

The control parameterization is repeated in a particularly preferred embodiment at predetermined intervals, in order to adapt the optimal control parameters to possibly varying properties of the transport unit or of the transport track.

Moreover with the method according to the invention it is also possible to determine characteristics of the control system, in particular from the frequency response the mass of the load which is carried by the transport unit. In this way it is then possible to select the corresponding optimal control parameters. In the same way, from the frequency response it is possible to determine resonance and anti-resonance frequencies, which are advantageously used in order to decide if the resonance and anti-resonance are attenuated in the control.

In an advantageous development, the transport unit follows a predetermined movement profile and in doing so at least one system parameter of a model of the control system is determined by means of a parameter estimation method, wherein the value of the system parameter over time is collected and from the variation of the system parameter over time a wear condition of the transport unit and/or the transport track is deduced. To this end, the driving coil controller may firstly also be parameterized as set out below. The system parameter reflects the condition of the transport track. Through observation of the variation of the system parameter over time, the possible wear may be therefore deduced. The current wear condition of the transport unit and/or of the transport track may then be used in different ways. The control may for instance be adapted to the wear condition, for instance in that the control parameters are varied, or maintenance of transport unit and/or transport track may be performed. In doing so it is an object to keep the necessary control interventions, in particular the amplitudes of control variables, at a minimum.

The system parameter is determined in an advantageous embodiment in that a stator current set on a driving coil is detected and at the same time it is calculated from the model of the control system and an error between the detected and calculated current is reduced to a minimum, in that the at least one system parameter of model is varied.

The control response of the control may be improved if a pilot control is implemented, which acts on the input of the driving coil controller. The pilot control essentially compensates the control error. It is then left to the driving coil controller to only compensate non-linearities, unknown external influences and disturbing variables, which are not controlled by the pilot control.

BRIEF DESCRIPTION OF THE DRAWINGS

The present invention is now described with reference to FIGS. 1 to 10, which schematically and illustratively show not limiting advantageous embodiments of the invention. In particular

DETAILED DESCRIPTION OF THE EMBODIMENTS

Figure 1:
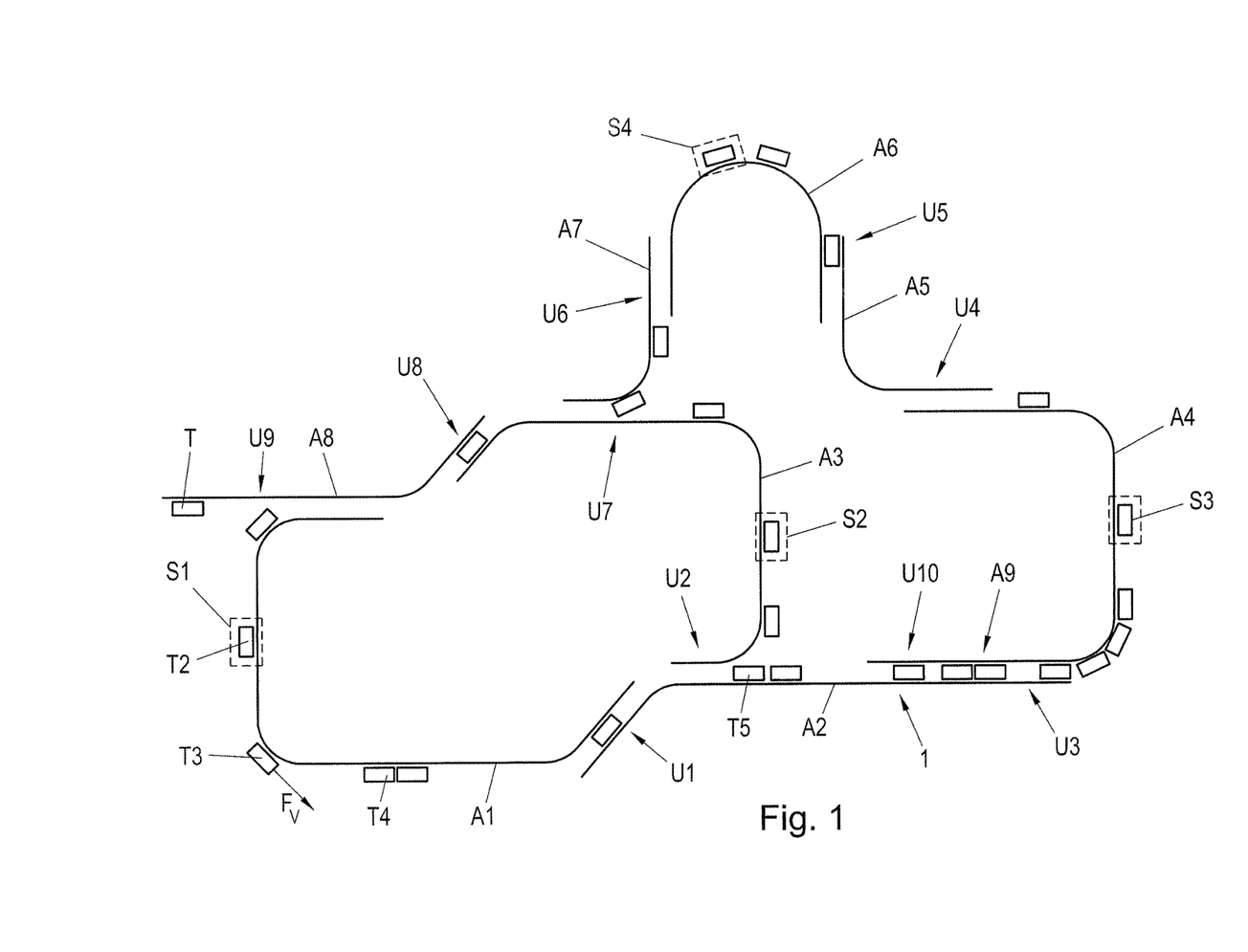
FIGS. 1 and 2 show a transport apparatus in form of a long stator linear motor.

In FIG. 1 a transport apparatus 1 in the form of a long stator linear motor is illustratively shown. The transport apparatus 1 consists of a number of transport sections A1 ... A9 (generally An), which are joined to form the transport apparatus 1. This modular construction enables a very flexible design of the transport apparatus 1, but also requires a plurality of transfer positions U1 ... U9, where the transport units T1 ... Tx moving on the transport apparatus 1 (for reasons of clarity in FIG. 1 not all transport units are provided with reference numerals) are passed from a transport section A1 ... A9 to another.

The transport apparatus 1 is designed as a long stator linear motor where the transport sections A1 ... A9 each form in a conventional manner a part of a long stator of a long stator linear motor. Along the transport sections A1 ... A9 a plurality of electrical driving coils are therefore longitudinally positioned in a known manner (not shown in FIG. 1 for clarity), interacting with the excitation magnets on the transport units T1 ... Tx (see FIG. 3). In a well-known manner by controlling the electrical stator current $i_A$ of the individual driving coils 7, 8 for each of the transport units T1 ... Tx a propulsive force Fv is independently generated, which moves the transport units T1 ... Tx in the longitudinal direction along the transport sections A1 ... A9, i.e., along the transport track. Each of the transport units T1 ... Tx may be moved individually (speed, acceleration, track) and independently (except for the avoidance of potential collisions) from the other transport units T1 ... Tx. Since this fundamental principle of long stator linear motors is well known, it will not be described here in detail.

Along the transport track of the transport apparatus 1 also some transfer positions U1 U10 are arranged. Here, various types of transfer positions U1 ... U10 are conceivable. At the transfer positions U2 and U7 a switch is provided, for example, while the other transfer positions U1, U3 ... U6, U8, U9 are designed as changeover points of a transport section A1 ... A8 to another. At the transfer position U10 a transition from a one-sided transport section A2 to a two-sided transport section A9 is provided. At transfer position U2 (switch) a transport unit T6 can be moved, for example, on the transport section A2 or the transport section A3. At a transfer position U1 (change position) a transport unit T5 is passed from the one-sided transport section A1 to the one-sided transport section A2. The transfer from one transport section to another transport section may take place in any suitable way.

Along the transport track of the transport apparatus 1, which is essentially given by the longitudinal direction of the transport section A1 ... A8, a number of work stations S1 ... S4 may also be arranged, in which a manipulation of the components transported by transport units T1 ... Tx takes place. The workstation S1 can be configured for example as an input and/or output station, in which the finished components are removed and components to be processed are passed to a transport unit T1 ... Tx. In workstations S2 ... S4 any processing steps can be performed onto the components. The transport units T1 ... Tx can be stopped in a workstation S1 ... S4 for processing, for example in a filling station for filling empty bottles, or be moved through, for example in a tempering station for heat-treating a component, optionally also at a different speed as between the work stations S1 ... S4.

Figure 2:
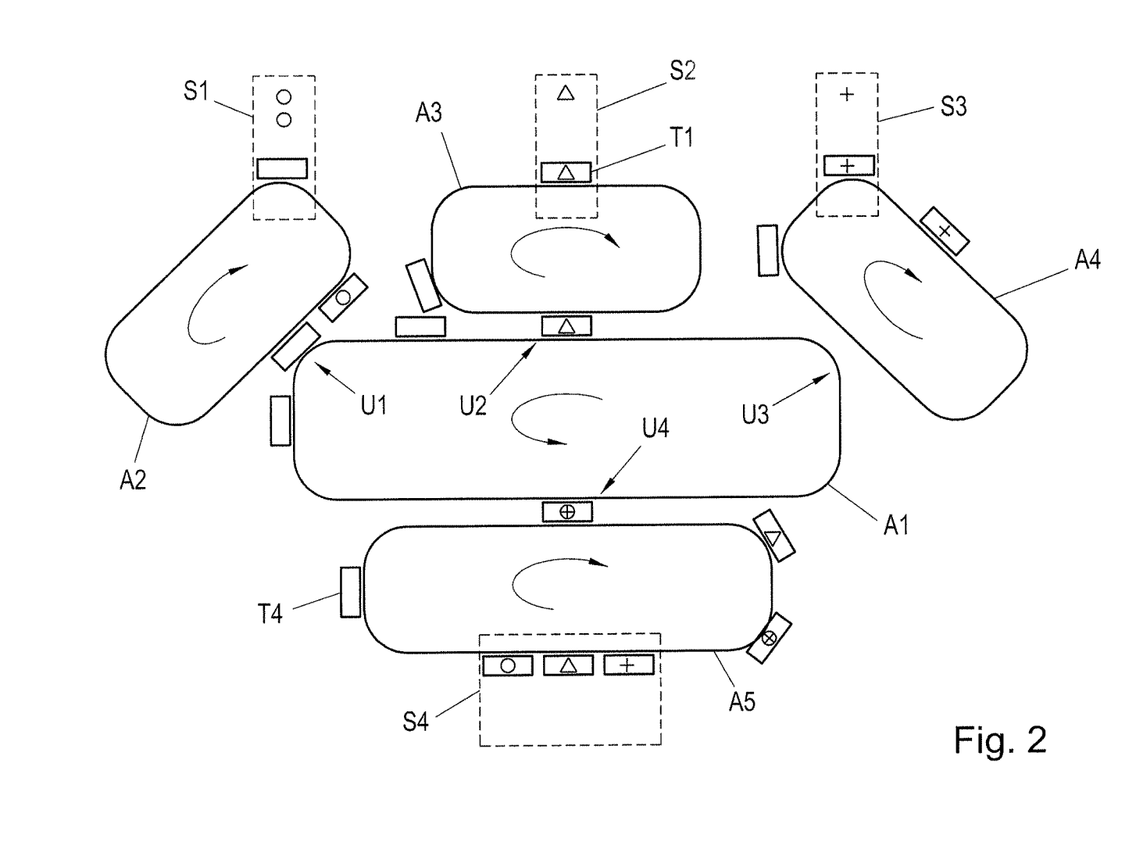

Another example of a transport apparatus 1 is shown in FIG. 2. Here five self-contained transport sections A1 ... A5 are provided. The transport sections A2 ... A4 in this case allow introduction of various components at the work stations S1 ... S3. In a workstation S4 of a transport section A5 these components are connected to each other or otherwise processed and discharged from the transporting apparatus 1. Another transport section A1 is used for the transfer of the components from the transport sections A2, A3, A4 into the transport section A5. To this end transfer positions U1, U2, U3 are provided in order to transfer the transport units Tx with the various components into the transport section A1. Furthermore, a transfer position U4 is provided in which the transport units Tx are transferred with the various components into the transport section A5.

The transport apparatus 1 may almost have an arbitrary form and may be composed of different transport sections A, wherein if necessary transfer positions U and work stations S may be provided.

Figure 3:
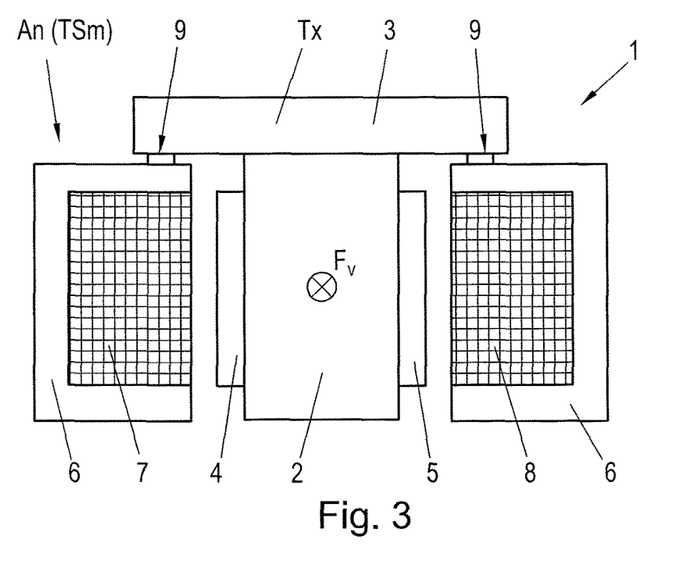
FIG. 3 shows a cross section of the transport unit.

FIG. 3 shows a cross section of an arbitrary transport section An and a transport unit Tx moved on the same. A transport unit Tx is composed, in the example shown, of a base body 2 and a component mount 3 positioned on the same for mounting a component to be transported (not shown), wherein the component mount 3 may be essentially be positioned in any position on the base body 2, in particular also on the bottom side for suspended components. On the base body 2, preferably on both sides of transport unit Tx, the number of excitation magnets 4, 5 of long stator linear motor are positioned. The transport track of transport apparatus 1, or of a transport section An, is formed by a stationary guide structure 6, on which the driving coils 7, 8 of long stator linear motor are positioned. The base body 2 with the bilateral permanent magnets as excitation magnets 4, 5 is positioned, in the example shown, between the driving coils 7, 8. In this way, at least an excitation magnet 4, 5 is arranged opposed of a driving coil 7, 8 (or of a group of driving coils) and interacts with at least one driving coil 7, 8 for generating a propulsion force $F_v$. The transport unit Tx is therefore moveable between the guide structure 6 with the driving coils 7, 8 and along the transport track.

Obviously, on the base body 2 and/or on the component mount 3 guiding elements 9, such as rollers, wheels, gliding surfaces, magnets, etc., may also be provided (which are not shown or only indicated for sake of clarity), in order to guide the transport unit Tx along the transport track. The guiding elements 9 of transport unit Tx interact, for guiding, with the stationary guide structure 6, for instance in that the guiding elements 9 contact the guide structure 6, glide or roll over the same, etc. The guiding of the transport unit Tx may also be achieved by guiding magnets. Obviously, other arrangements of driving coils 7, 8 and of interacting excitation magnets 4, 5 are conceivable. For example it may also be possible to position the driving coils 7, 8 on the inside and the excitation magnets 4, 5 inwardly directed and surrounding the driving coils 7, 8. In the same way, excitation magnets may be provided only on one side of a transport unit Tx. In this case driving coils on only one side of the transport unit Tx would also be sufficient.

Figure 4:
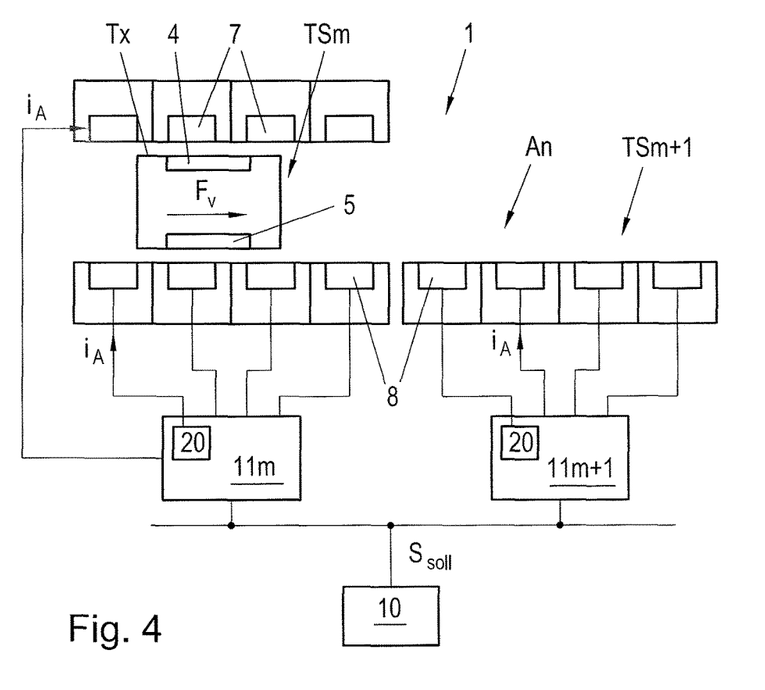
FIG. 4 shows the control scheme of the transport apparatus.

In order to propel a transport unit Tx in a forward direction, a stator current $i_A$ is applied on driving coils 7, 8 in the area of the transport unit Tx, as known (FIG. 4), wherein in different driving coils 7, 8 different stator currents $i_A$ (value and vector direction) may be applied. It is sufficient to apply a stator current $i_A$ only in the driving coils 7, 8, which may currently interact with the excitation magnets 4, 5 of the transport unit Tx. In order to generate a propulsion force acting on the transport unit Tx, a driving coil 7, 8 is electrified with a stator current $i_A$ with a propulsion force generating current component $i_{Aq}$.

However, for the movement of the transport unit the bilateral driving coils 7, 8 do not have to be simultaneously energized by applying a stator current $i_A$. It is sufficient in principle, if the propulsion force $F_v$ acting on the transport unit Tx for moving the same is generated only by means of the drive coils 7, 8 on one side. On track sections of the transport track, in which a large propulsive force $F_v$ is required, for example in the case of a slope, a heavy load or in areas of acceleration of the transport unit Tx, the drive coils 7, 8 can be energized on both sides (for example, the transport section A9 of FIG. 1), whereby the propulsive force $F_v$ can be increased. It is also conceivable that in certain transport sections An, the guide structure 6 is provided only on one side, or that in certain transport sections An, the guide structure 6 is provided on both sides, but is only provided with driving coils 7, 8 on one side. This is also indicated in FIG. 1 in which track sections with bilateral guide structure 6 and track sections with only one-sided guide structure 6 are shown.

It is also known to compose a transport section An with individual transport segments TS, which each support a number of driving coils 7, 8. A transport segment TS may be controlled by an associated segment control unit 11, as for instance described in U.S. Pat. No. 6,876,107 B2 and shown in FIG. 4. A transport unit Tx, which is in a transport segment TSm, is therefore controlled by the corresponding segment control unit 11*m*. Essentially this means that the segment control unit 11*m* controls the driving coils 7, 8 of the corresponding transport segments TSm in a way that the transport unit Tx is moved by the generated propulsion force Fv in the desired way (speed, acceleration) along the transport segment TSm. If a transport unit Tx moves from a transport segment TSm to the following transport segment TSm+1, the control of transport unit Tx is also transferred in ordered way to the segment control unit 11*m*+1 of following transport segment TSm+1. The movement of the transport unit Tx through the transport apparatus 1 may be monitored in a hierarchically superior plant control unit 10, which is connected with the segment control units 11. The plant control unit 10 controls the movement of the transport unit Tx through the transport apparatus 1 for example through position settings $s_{soll}$ or speed setting $v_{soll}$. The segment control units 11 then compensate a possible error between setpoint value and actual value, in that a stator current $i_A$ is applied to the driving coils 7, 8 of transport segment TSm. To this end it is obviously necessary to measure an actual value, as for example an actual position s or an actual speed v, by means of suitable sensors or to estimate the same based on other measured variables or other known or calculated variables. It may obviously also be possible to provide for the driving coils 7, 8 of each side an own segment control unit 11, wherein the segment control units 11 on each side may also be connected to each other through a data line, and may exchange data, for example measurement data of an actual variable.

Each segment control unit 11 generates, from the setpoint value setting $s_{soll}$ or $v_{soll}$ and the actual values s or v a stator current $i_A$, with which the required driving coils 7, 8 are energized. Preferably, only the driving coils 7, 8 are controlled which interact with the transport unit Tx, or with its excitation magnets 4, 5. The stator current $i_A$ is a current vector (current space vector), which comprise a propulsive force generating q-component $i_{Aq}$ for generating the propulsive force $F_v$ and optionally a lateral force generating d-component $i_{Ad}$ which causes a magnetic flux $\psi$.

Figure 5:
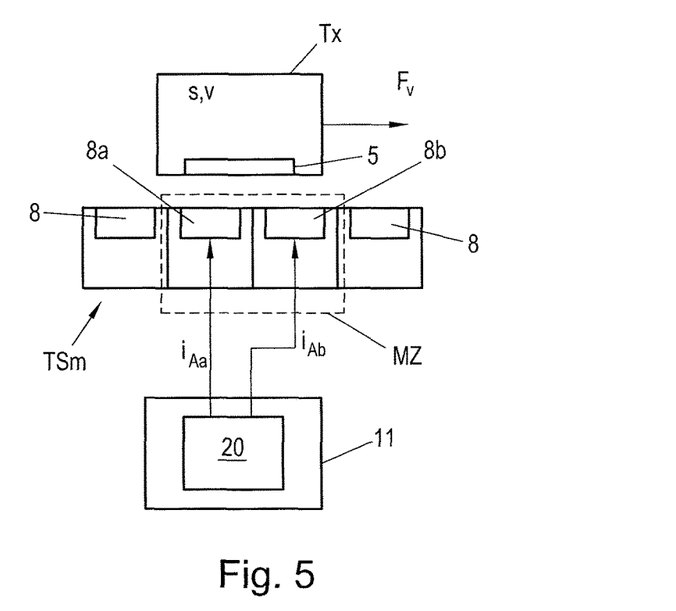
FIGS. 5 and 6 show the fundamental concept for identification of control parameters of a driving coil controller.

In order to control the movement of a transport unit Tx, in a segment control unit 11 a driving coil controller 20 is implemented, which controls all driving coils 7, 8 of the transport segment TSm, as shown in FIG. 5.

Figure 6:
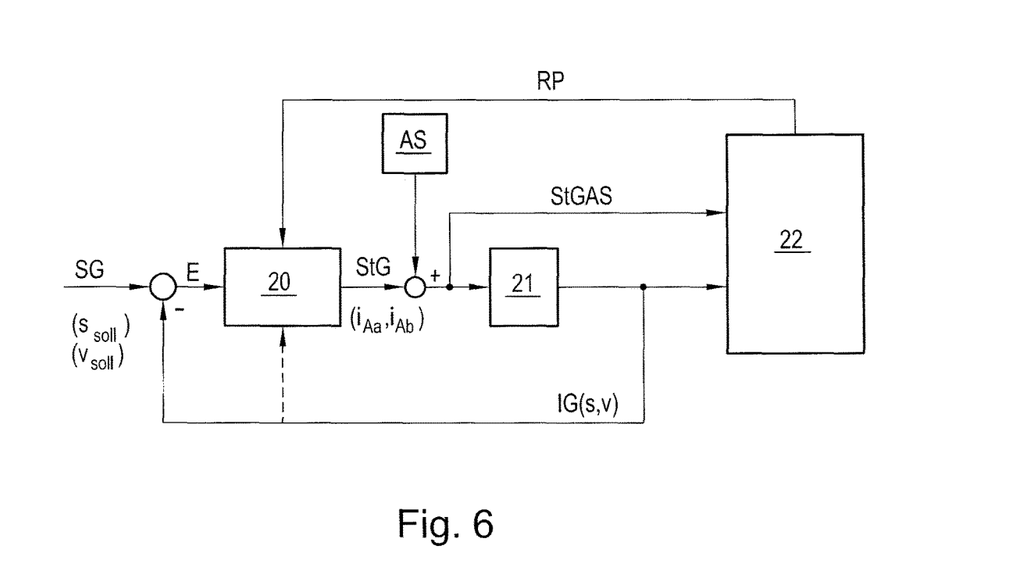

FIG. 6 shows the basic control principle and the inventive principle for identification of control parameters RP of a driving coil controller 20 of a driving coil 8*a*, 8*b* as a block diagram. The controlled system 21 (essentially the technical system or the components between applying of control variables for example in the form of the stator current $i_A$ and the detection (measurement, estimation, calculation) of the actual variable IG in form of an actual position s or actual speed v of transport unit Tx, in particular driving coils 8*a*, 8*b*, transport unit Tx with excitation magnets 5 and also the interaction of the transport unit Tx with the transport section An) is controlled by the driving coil controller 20 for each driving coil 8*a*, 8*b* in a conventional manner in a closed control circuit. To this end, as known, an actual variable IG, for example an actual position s or actual speed v of transport unit Tx, are detected and returned. The actual variable IG may be measured, may be derived from other measured, calculated or known variables or may be determined by a controlling observer. The actual variable IG may therefore be considered already known and may also be provided to the driving coil controller 20, as shown in FIG. 6. From a control error E composed of the difference between the setpoint variable SG, for example a setpoint position $s_{soll}$ or setpoint speed $v_{soll}$, and actual variable IG, the driving coil controller 20 determines a control variable StG, for example a stator current $i_{Aa}$, $i_{Ab}$ for each driving coil 8*a*, 8*b* to be electrified.

Figure 7:
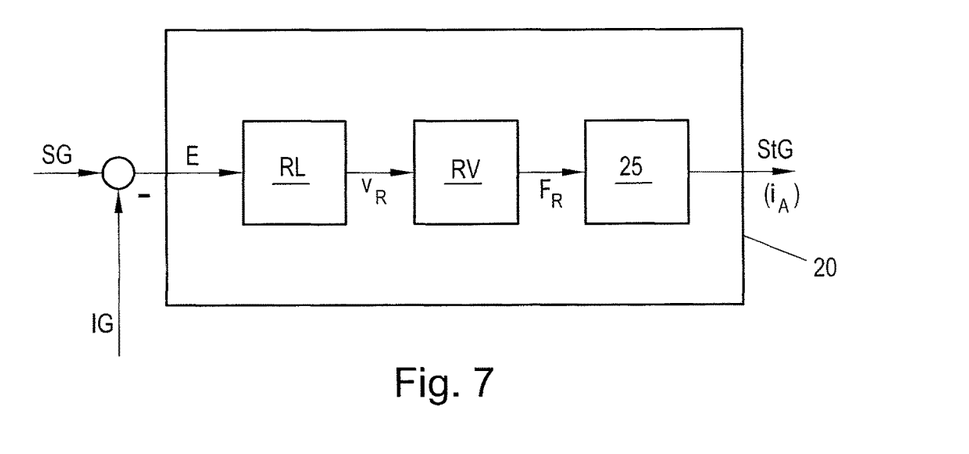
FIG. 7 shows a control cascade of the driving coil controller with pilot control and smoothing filter.

The driving coil controller 20 may comprise a control cascade of a position controller RL and a speed controller RV, as shown in FIG. 7. Although only a position controller RL or only a speed controller RV would also be sufficient. Notoriously, the position controller RL calculates, from the setpoint variable SG and actual variable IG a control speed $v_R$, from which the speed controller RV in turn calculates a control propulsion force $F_R$, wherein also in this case the actual variable IG may be considered. This control propulsion force $F_R$ is at last converted in a conversion block 25 into the stator current $i_A$ as the control variable StG. To this end, for example, assuming $i_{Ad}=0$ or $i_{Ad}<<i_{Aq}$, the known relation, $$F_R = \frac{K_f}{\sqrt{2}} i_{Aq}$$

with the known motor constant $K_f$ may be used. If in the speed controller RV the stator current $i_A$ is directly calculated as control variable StG, the conversion block 25 may also be omitted.

Figure 8:
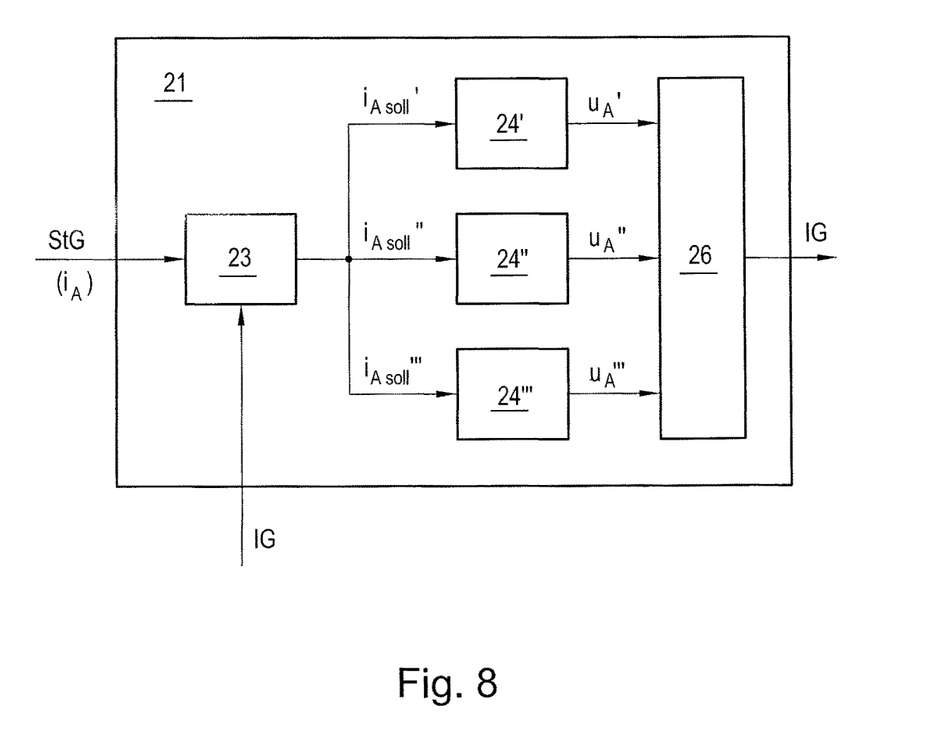
FIG. 8 shows the distribution of the propulsion force to be controlled to the individually operating driving coils.

Since a transport unit Tx always interacts with several driving coils 7, 8 simultaneously, the propulsion force $F_R$ to be controlled or the stator current $i_A$, is provided by all driving coils 7, 8, which are acting on the transport unit Tx. The propulsion force $F_R$ to be controlled is therefore to be still distributed according to the actual (known) position s of the transport unit Tx on the individual acting driving coils 7, 8, as shown in FIG. 8. The control variable StG in form of the stator current $i_A$ is therefore subdivided in a current distribution unit 23 in individual setpoint driving coil currents $i_{Asoll}'$, $i_{Asoll}''$, $i_{Asoll}'''$ of acting driving coils 7, 8. From the actual position it is anytime known, which contribution is given by each acting driving coil 7, 8. From the setpoint driving coil currents $i_{Asoll}'$, $i_{Asoll}''$, $i_{Asoll}'''$, the required coil voltage $u_A'$, $u_A''$, $u_A'''$ of acting driving coils 8', 8", 8''', which have to be applied on the driving coils in order to set the setpoint driving coil currents $i_{Asoll}'$, $i_{Asoll}''$, $i_{Asoll}'''$, are then calculated in the single coil controllers 24', 24", 24''' associated to respective driving coils 7, 8. To this end it is also possible to foresee that current actual variables of stator currents $i_A$ are provided to the single coil controllers 24', 24", 24'''.

Since an individual coil controller 24 depends only on the concrete realization of the driving coils 7, 8, the controller 24 or its parameters may be set preemptively, or may be considered known. For this reason, the single controllers 24 are preferably associated to the controlled system 21, as shown in FIG. 8. In the same way, the distribution of the control variable StG in variables of individual acting driving coils 7, 8 is preferably associated to the controlled system 21. The coil voltages $u_A'$, $u_A''$, $u_A'''$ of acting driving coils 8', 8'', 8''' are then applied to the motor hardware 26 of the long stator linear motor.

The distribution of the control variable StG in variables of individually acting driving coils 7, 8 may however also be accomplished obviously in the driving coil controller 20. The output from the driving coil controller 20 would then be a control variable StG for each acting driving coil 7, 8. In this case, obviously, several excitation signals AS, i.e. an excitation signal AS for each acting coil 7, 8, should be provided. At the same time it is possible to provided single coil controllers 24 in the driving coil controller 20. In this case the control variables StG would be voltages, wherein the excitation signal AS is to be considered a voltage. The inventive idea is not affected by this.

In this control concept the position controller RL and the speed controller RV may be considered as pertaining to the transport unit Tx. Therefore there are as many position controllers RL and speed controllers RV as there are transport units Tx. For each driving coil 7, 8 there is an underlying single coil controller 24', 24'', 24'''.

As usual, the driving coil controller 20, or the controller implemented in the same, has a number of control parameters RP to be adjusted, so that a stable and sufficiently dynamic control of movement of transport unit Tx is feasible. The control parameters RP are usually set once, normally before or during the activation of the transport system 1, for example through the plant controlling unit 10. It is to be noted that the control parameters of the individual coil controller 24 do normally not have to be parameterized, since the single coil controller 24 are essentially only dependent on the concrete known embodiment of the driving coils 7, 8. These control parameters of the single coil controllers 24 are therefore normally known, and have not to be varied. Therefore the control parameters of the control parts associated with the transport unit Tx have normally to be parameterized, i.e. for instance of the position controller RL and of the speed controller RV.

The determination of the control parameters RP is however difficult. On the other side, during operation of the transport apparatus 1, the controlled track (driving coils 7, 8, transport unit Tx with excitation magnets 4, 5) and also the interaction of the transport unit Tx with the transport section An may vary. Such a variation may for example take place even when the transport unit Tx is differently loaded. At the same time friction between the transport unit Tx and the guide structure 6 of transport section An has an effect, wherein the friction may depend on the current wear condition of the transport unit Tx and the transport section A. But even operating parameters, like for instance the current velocity of the transport unit Tx or the ambient temperature, may act on the controlled system 21, for instance through friction dependent on speed or temperature, and influence the control. In order for the driving coil controller 20 to stably control even with these very different conditions, varying in a wide range, the driving coil controller 20 had to be set with very conservative control parameters so far. The control dynamics is reduced by that, however, in the sense of rapid control interventions, as for example fast speed variations. In order to improve this problem, the following actions are taken according to the invention, wherein reference is made to FIG. 5 and FIG. 6.

A measurement cell MZ is defined, wherein the measurement cell MZ comprises at least two driving coils 8a, 8b on one side, which interact with the transport unit Tx, preferably at least two adjacent driving coils 8a, 8b, as shown in FIG. 5. In FIG. 5, for simplification and without any limitation on generality, only one side of a single transport segment TSm with the transport unit Tx is shown. If transport segments TSm are provided with a plurality of driving coils 8, then the measurement cell MZ preferably comprises all driving coils 8 of transport segment TSm or all driving coils 8 of several transport segments TSm.

Initially, an approximate parameterization of the control parameters RP is performed. This may be performed on the basis of a known mass of the transport unit Tx (including the load to be expected) and the known design data of the long stator linear motor, wherein the control parameters RP are normally adjusted so that the closed control loop has a very reduced bandwidth (reduced dynamic), but a great robustness (high stability). Depending on the driving coil controller 20 used, for example a conventional PI-controller, different methods for control parameterization are known, with which an approximate parameterization may be achieved. The approximate parameterization should only ensure that the transport unit Tx may be moved and positioned without imposing heavy requirements on dynamic and precision. With this approximate parameterization it is possible to move the transport unit Tx to a determined operating point, in that a corresponding setpoint value SG is preset. The operating point is here a determined position s (stop of transport unit Tx) or a determined speed v of transport unit Tx. "To move the transport unit Tx to a determined operating point" means of course that the operating point is reached in the area of the measurement cell MZ, i.e. the transport unit Tx is moved for instance with a determined speed through the measurement cell MZ, or that the transport unit Tx is moved in the area of the measurement cell MZ and is stopped there.

In the operating point, in the closed loop control circuit an excitation signal AS is introduced, in that the control variable StG is superimposed with the excitation signal AS. The excitation signal AS is applied on all driving coils 8a, 8b of measurement cell MZ. The excitation signal AS comprises a predetermined frequency band. Possible excitation signals AS are for example a known pseudo-random binary sequence signal (PRBS) or a Sinus-Sweep signal. The frequencies in the excitation signal AS and the amplitudes of the excitation signal AS are selected in a way that the system responses are sufficiently informative, i.e. that the system responses in the relevant frequency range are sufficient for being evaluated. An interesting frequency range is in particular the range in which a resonance or anti-resonance is expected. For the actual application, a frequency range between 10 Hz and 2500 Hz, in particular between 500 Hz and 1000 Hz, is often interesting. The amplitudes of the excitation signal AS may depend on the nominal current (or nominal voltage) of the long stator linear motor and are typically in the field of $\frac{1}{10}$ of the nominal current (or nominal voltage). The excitation signal AS should preferably have a mean value of zero, whereby the controlled system (control system 21) itself remains on average essentially undisturbed. With the excitation signal AS, the desired movement of the transport unit Tx (given by the position settings $s_{soll}$ or speed setting $v_{soll}$ for approaching the operating point) is superimposed with an excitation movement, which is only possible when the measurement cell MZ comprises at least two driving coils 8a, 8b.

The control variable StGAS superimposed with the excitation signal AS and the response of the control system 21 to this excitation, which corresponds to the actual variable IG, are sent to an evaluation unit 22. The response of the control system 21 is naturally the actual movement condition of the transport unit Tx as actual position s or actual speed v. The response of the control system 21 may be directly measured, may be derived from other measurement variables or may also be calculated or otherwise estimated by an observer. In the evaluation unit 22 from the control variable StGAS superimposed with the excitation signal AS and the response of the control system 21 the frequency response (with amplitude and phase response) is determined in well known manner, typically through filtration and discrete Fourier-transformation of both signals and successive element-wise division of both signals according to scheme: output divided by input. The frequency response may be determined for the open and/or closed control circuit.

It is to be noted that on one side it is necessary that several driving coils 8a, 8b of measurement cell MZ have to be superimposed with the excitation signal AS, although for determination of the control parameters RP only the superimposed control variable StGAS of one of the driving coils 8a, 8b of measurement cell MZ has to be evaluated. If in the following frequency response is cited, then this is the frequency response pertaining to the transport unit Tx and a driving coil 8a, 8b interacting with the transport unit Tx.

Figure 9:
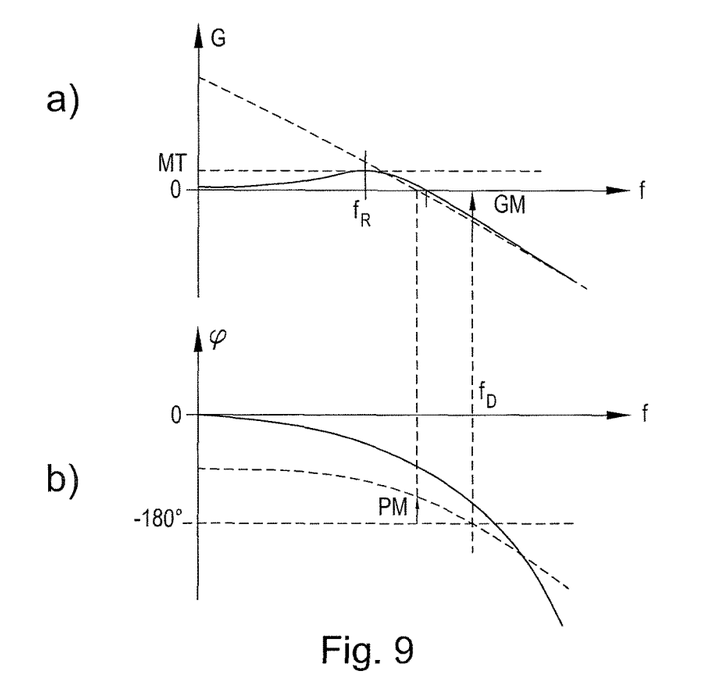
FIG. 9 shows a frequency response of the control system and FIG. 10 shows a driving coil controller with pilot control.

The frequency response may be used as a basis for determining the optimal control parameters RP. To this end, various methods, known in the field of controls, may be used. To this end the control parameters RP are varied, in order to set a determined property of the frequency response in a desired manner. A known method is for example the Maximum Peak Criteria. The method of the Maximum Peak Criteria is explained with reference to FIG. 9, as an example. In the same, the frequency response is represented as an amplitude response (FIG. 9a above) and phase response (FIG. 9b below), for an open (dotted) and closed control circuit. The open control circuit, as is well known, is the observation without feedback of the actual variable IG on the setpoint value SG. The control parameters RP are varied now in the Maximum Peak Criteria so that the maximum value of the amplitude response of the closed control circuit does not exceed a predetermined value MT. This value MT is obtained for example from the desired limits for the amplification and phase reserve of the open control circuit. In this way it is ensured that the open control circuit has a sufficient phase reserve PM (phase φ in case of 0 dB amplification) and amplification reserve GM (amplification G with phase−180°). Depending on the implementation of the driving coil controller 20 naturally different control parameters RP have to be varied, as for example an amplification and integral time in a PI-controller.

For the variation of the control parameters RP different methods can be used. For example an optimization problem may be formulated, in order to minimize the distance between the maximum of the amplitude response of the closed control circuit and the value MT.

In this way, for the respective transport unit Tx the optimal control parameters RP are obtained. These control parameters RP may now be used also for same transport units Tx. It is also possible to conceive to determine for each or various transport units Tx the respective optimal control parameters RP.

The determination of the control parameters RP may also be performed for different operating points and/or different loads of the transport unit Tx. Equally, the control parameters RP for a transport unit Tx may be determined also for different measurement cells MZ. In this way, during operation of long stator linear motor for a transport unit Tx it is possible to switch between different control parameter sets. For example, the control parameter set may be selected, which best matches the momentary load conveyed with a transport unit Tx or the current speed or position of the same. In this way, for each transport unit an own or even several control parameter sets may be created. In this way it is possible to consider differences between the different transport units Tx. Ideally, how and with which load the transport units Tx are moved in the transport apparatus 1 is already known before. In this way for the control parameterization the matching operating point or the matching measurement cell MZ may selected.

The frequency response also contains other fundamental characteristics of the control system 21. For example, during use, from the amplitude response the total mass $m_G$ of the transport unit Tx may be determined. From it, in turn, the load of the transport unit Tx may be deduced, since the mass $m_{TX}$ of the transport unit Tx is known. A possible difference has then to be caused by the load, whereby the load can be determined. In case of a known load, it is possible to select, for example, in turn, the suitable control parameter set for optimal control of transport unit Tx. For determining the total mass $m_G$ for example the amplitude response $|G(j2\pi f)|$ at low frequencies f is evaluated and the following relation holds $$|G(j2\pi f)| = \frac{K_f}{2 \cdot \pi \cdot f \cdot m_G},$$

with the known normalized motor constant $K_f$ and the total mass $m_G$. This relation is valid for sufficiently small values of frequency f presuming a low viscous friction (friction force is proportional to modulus of speed and in opposed direction), which may be assumed in the present case. From this the total mass $m_G$ may be calculated.

Moreover, from the frequency response (FIG. 9) as a characteristic of the control system 21 possible resonance and anti-resonance frequencies may be determined, which occur always in pairs. A resonance/anti-resonance frequency may be assumed for local or global maxima/minima of the amplitude response. By evaluating the amplitude response of the open control circuit it is possible to easily find such local or global maxima/minima, event automated. If resonance frequencies $f_R$ and anti-resonance frequencies $f_{AR}$ are present, depending from the position of the resonance frequencies $f_R$ and anti-resonance frequencies $f_{AR}$ on the frequency axis, it is possible to categorize the control system 21 in categories, like rigid, stiff and flexible. A control system 21 may be considered rigid, when the resonance/anti-resonance pair with the lowest frequency values ($f_R$, $f_{AR}$) is clearly higher than the phase passing frequency $f_D$. The phase passing frequency $f_D$, as is well known, is the frequency at which the phase φ of the open control circuit intersects for the first time the value −180°. The control system would be rigid, if the frequency values ($f_R$, $f_{AR}$) of the resonance/anti-resonance pair are in the region of the phase passing frequency $f_D$ and flexible if the frequency values ($f_R$, $f_{AR}$) of the resonance/anti-resonance pair are clearly lower than the phase passing frequency $f_D$. Depending on the category, it is decided, if the resonance/anti-resonance frequencies ($f_R$, $f_{AR}$) have a disturbing effect and with which measures these maybe eliminated or dampened, for example by a suitable filter.

The control parameterization and/or the determining of the characteristics of the control system 21 may also be repeated during the operation, at certain intervals. In this way the driving coil controller 20 may be continually adapted to variable wear conditions of transport unit Tx and therefore to a varied control system 21. The control parameterization may for example be performed daily before the deactivation of the transport apparatus 1 or before the starting of the transport apparatus 1.

The determined control parameters RP may then also be checked for plausibility. For example, to this end, the driving coil controller 20 with the determined optimal control parameters RP could be used to move to the operating point used for control parameterization and the excitation signal AS then again be superimposed. The frequency response of the closed control circuit is again determined and based on its maximum resonance amplification it is decided whether the behavior of the closed control circuit is satisfying. In the same way, it would be possible, in addition or as an alternative, to check the position of resonance frequency $f_R$ or anti-resonance frequency $f_{AR}$ and/or of phase passing frequency $f_D$ and therefore check the plausibility of the control parameters RP.

Along the transport track of the transport apparatus 1 various measurement cells MZ may also be provided. In this way also different optimal control parameters RP for different sections of the transport track may be determined. The determined control parameters RP for one transport unit Tx are preferably always valid from a first measurement cell MZ1 to the following measurement cell MZ2.

With a parameterized driving coil controller 20 it is now possible to analyze also the control system 21 in view of further system parameters interesting for the process. To this end, the control parameters RP of the driving coil controller 20 may be identified as described above, but may also be defined in another way or may also be known. Basically, the only presumption is that with the driving coil controller 20 a predetermined movement profile may be followed with the transport unit Tx. The movement profile shall excite the control system 21 in a sufficient manner, in order to identify the system parameters. For this a transport unit Tx is moved with a given movement profile, for example as a temporal variation of different speeds and accelerations (also in the sense of decelerations). It is advantageous, if movements in both directions are present, in order to detect direction-dependent system parameters. This movement profile, as setpoint variables of the control, is followed by the transport unit Tx under the control of the driving coil controller 20. For this, the driving coil controller 20 generates, according to the movement profile, control variables StG, which act on the control system 21, and cause actual variables IG of the control system 21, which are fed back on the setpoint variables SG in a closed control loop.

For the control system 21 a model with system parameters is now assumed, that pretty well describes the control system 21. For example, for the transport unit Tx, the movement equation $$F_V = m_G \frac{dv}{dt} + kv \cdot v + ks \cdot \text{sign}(v)$$

may be written, with the total mass $m_G$ of transport unit Tx, a coefficient kv for viscous friction, a coefficient ks for static friction, the current speed v of transport unit Tx and the sign function "sign". The propulsion force $F_v$ acting on the transport unit Tx is composed, as said, by the effects of all driving coils 7, 8 acting on the transport unit Tx according to $$F_V = \sum_i F_{VASi},$$

where $F_{VASi}$ is the force applied by a driving coil 7, 8. This force may be modeled, as known, for a long stator linear motor, in the form $$F_{VASi} = \frac{3}{2} \left\{ i_{Adi} \frac{\delta \Psi_p}{\delta x} + \frac{\pi}{\tau_p} [\Psi_p i_{Aqi} + i_{Adi} i_{Aqi} (L_{Adi} - L_{Aqi})] \right\}.$$

In this case, $\Psi_p$ indicates the magnetic flux generated by excitation magnets 4, 5 and linked with the driving coil 7, 8, $\tau_p$ corresponds to pole width of excitation magnets of transport unit Tx and x indicates the position of transport unit Tx. $L_{Ad}$ and $L_{Aq}$ indicate known inductivities of driving coils 7, 8 in the d and q direction. Supposing that $i_{Ad}=0$ or $i_{Ad} \ll i_{Aq}$, this equation may be simplified to $$F_{VASi} = \frac{3}{2} \frac{\pi}{\tau_p} \Psi_p i_{Aqi} = \frac{K_f}{\sqrt{2}} i_{Aqi}$$

with motor constant $K_f$. The stator current $i_{Aq}$ of a driving coil 7, 8 is then obtained from the corresponding contribution of the driving coil 7, 8 to the propulsion force $F_v$.

The system parameters of the model of the control system 21, in this case the total mass $m_G$ of transport unit Tx, the coefficient $k_v$ for viscous friction, the coefficient ks for static friction, may be determined from this under the assumption of a known motor constant $K_f$ through known parameter estimation methods. If another system parameter is known, for example the total mass $m_G$ as mentioned above, the motor constant $K_f$ may also be estimated. For parameter estimation the predetermined movement profile is followed, whereby the speed v (or equivalently position s) and acceleration $$\frac{dv}{dt}$$

are defined as inputs in the parameter estimation method. The stator current $i_{Aq}$ set on driving coil 7, 8 corresponds to control variable StG and is known or may be detected in another way, for example by measuring. At the same time the stator current $i_{Aq}$ is calculated from the model of the control system 21 and the error (for example the mean quadratic error) between the calculated and measured stator current due to variation of system parameters of the model is minimized. Known parameter estimation methods are for example the least-square method, the recursive least square method, a Kalman or extended Kalman filter.

The determined system parameters identify the control system 21 therefore in particular also the transport track or a transport section An or a transport segment TSm through coefficients kv for viscous friction and coefficient ks for static friction, as well as the air gap between the excitation magnet 4, 5 and driving coil 7, 8 through parameter $K_f$. Through observation of the temporal variation of these system parameters in the same section of the transport track the wear condition of the transport unit Tx and/or of the transport track may be deduced, in particular of transport section An or transport segment TSm. If the system parameters of control system 21 are regularly determined, for example each day one time, then from its temporal variation from the coefficient kv for viscous friction and ks for static friction, a possible wear may be deduced. If these coefficients rise, then this is an indication that wear is progressing. Also from the motor constant $K_f$ a variation of air gap may be recognized, which may also indicate a progression of wear. In case of inadmissible variations, for example determined through exceeding a predetermined threshold, the maintenance of transport unit Tx and/or of transport section An may be triggered.

Figure 10:
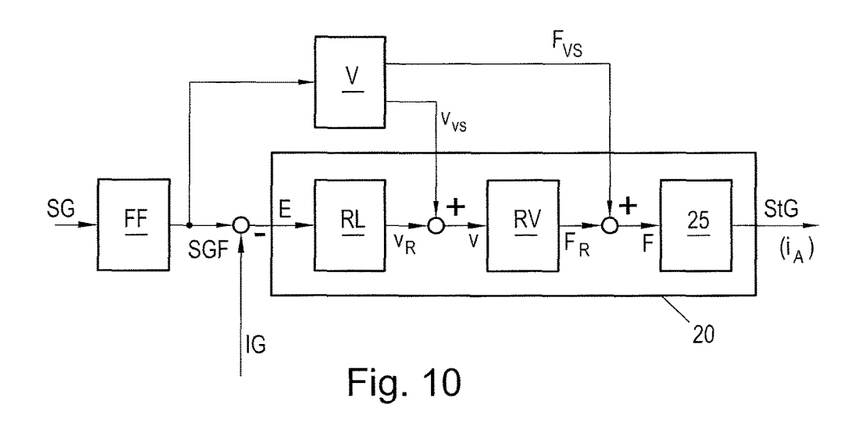

In order to improve the control response of the control of movement of transport units Tx through the driving coil controller 20, the driving coil controller 20 may also be provided with an additional pilot control V. The pilot control V acts (for example by addition) on the input of the driving coil controller 20. This is shown in FIG. 10 in the example of a cascaded driving coil controller 20. The pilot control V acts (for example through addition) on the input of the respective controller, i.e. a speed pilot control $v_{vs}$ on the input of speed controller RV and a force pilot control Fvs on the input of conversion block 25. The pilot control V may be conventionally based on a model of the control system 21, wherein as a pilot control V the inverse of the model of the control system 21 is normally used. The model is preferably implemented as movement equations of the transport unit Tx, as explained above. The model is defined by the identified system parameters, whereby also the pilot control (as an inverse of the model) is defined. Instead of a model of the control system 21, any other pilot control law may also be implemented.

For a speed pilot control $v_{vs}$ it is for instance possible to use the following model, $$v_{vs} = \frac{ds}{dt},$$

with the current actual position s as the actual variable IG.

The speed controller RV therefore controls only non-linearities, unknown external influences and disturbing variables, which cannot be controlled by the speed pilot control $v_{vs}$.

For a force pilot control $F_{vs}$ the above mentioned model may be used, $$F_{VS} = m_G \frac{dv}{dt} + kv \cdot v + ks \cdot \text{sign}(v),$$

with the coefficient kv for viscous fiction, coefficient ks for static fiction, current speed v of transport unit Tx and the sign function.

From thus determined force setting, which is required for compensate the current control error E, the conversion block 25 calculates the control variable StG for a driving coil 7, 8, for example in the form of the stator current $i_A$, to be set. The current control RS controls with a force pilot control only non-linearities, unknown external influences and disturbing variables, which cannot be controlled by the force pilot control.

Moreover, the driving coil controller 20 may be complemented in a known way also through a smoothing filter FF, even without pilot control V, as shown in FIG. 10. The smoothing filter FF may be implemented, from a control technical point of view, for example as a filter with a finite impulse response (FIR-filter) with a time constant T. The smoothing filter FF is used filter the setpoint variable SG, for avoiding the excitation of certain undesired frequencies. For instance, the smoothing filter FF may be implemented as a limiter of jerk (wherein the jerk is the time derivative of acceleration).

The setpoint variable $SG_F$ filtered by the smoothing filter FF is then used for pilot control V and control through the driving coil controller 20.

From a presetting of a movement profile provided as a point-to-point positioning of the transport unit Tx, at the end of this movement profile, the tracking error behavior (difference between the setpoint and actual movement profile) may be evaluated. From the period duration of the decaying oscillation of the tracking error (for example as an amplitude ratio of both first half-waves) and the period duration of the first oscillation, as known, it is possible to calculate the time constant T of the smoothing filter FF, which corresponds to the period duration.

The determination of the system parameters of model of control system 21 and/or of parameters of smoothing filter FF naturally depend on the transport track, due to the setting of the movement profile. Properties of the transport track may therefore be derived, as for instance static and dynamic friction parameters. By means of these properties of the transport track, in particular the time variation of these properties, it is therefore also possible to deduce the condition of the transport track. If the same properties on the same transport track are determined for different transport units Tx, based on a comparison between the properties, the (wear) condition of the transport unit Tx may also be deduced.

The application of a movement profile for determining the system parameters and/or parameters of the smoothing filter FF is preferably performed on a track section, along which no strict requirements are put on the movement of the transport unit Tx (speed setting, position setting).

It is also conceivable to determine the system parameters and/or the parameters of the smoothing filter FF on various transport sections An, for example for each transport segment TSm. In this way, through observation of the variaton of system parameters over time of different transport sections An, the wear condition of different transport sections An may be deduced.

What is claimed:

1. A method for operating a long stator linear motor by moving at least one transport unit along at least one transport track having plural successively arranged driving coils arranged along the at least one transport track, the method comprising:
controlling each of the plural successively arranged driving coils with a driving coil controller,
wherein, during the controlling:
the driving coil controller sets control variables (StG) for driving coils of the plural successively arranged driving coils that interact with the at least one transport unit;

the control variables (StG) of at least one of the driving coils are superimposed with an excitation signal (AS) having a predetermined frequency band;
actual variables (IG) are determined;
a frequency response is determined from control variables (StGAS) superimposed with the excitation signal (AS) and the actual variables (IG);
first control parameters (RP) of the driving coil controller are determined from the frequency response for the at least one transport unit; and
movement of the at least one transport unit along the at least one transport track is controlled utilizing the first control parameters (RP).

2. The method of claim 1, wherein the control parameters (RP) are varied in order to set a predetermined property of the frequency response.

3. The method of claim 1, wherein the first control parameters (RP) control another different transport unit.

4. The method of claim 1, further comprising determining second control parameters (RP) for the other different transport unit.

5. The method of claim 4, wherein the driving coil controller utilizes the first or second control parameters (RP) for controlling movement of the at least one transport unit on different transport sections of the at least one transport track.

6. The method of claim 1, further comprising determining the control parameters (RP) at predetermined intervals.

7. The method of claim 1, further comprising determining the control parameters (RP) for different loading conditions of the at least one transport unit.

8. The method of claim 7, further comprising:
determining, from the frequency response, a mass of a load carried by the at least one transport unit (Tx); and
selecting corresponding control parameters (RP) based on the mass.

9. The method of claim 8, wherein the determining is repeated at predetermined intervals.

10. The method of claim 1, further comprising:
first determining, from the frequency response, resonance and anti-resonance frequencies ($f_R$, $f_{AR}$); and
second determining, based on a phase passing frequency ($f_D$) of frequency response, if the resonance and anti-resonance frequencies ($f_R$, $f_{AR}$) are attenuated.

11. The method of claim 10, wherein the first determining is repeated at predetermined intervals.

12. The method of claim 1, further comprising:
utilizing a predetermined movement profile for the at least one transport unit;
utilizing parameter estimation;
collecting a system parameter value over time; and
determining, from a variation of the system parameter value over time, a wear condition of the at least one transport unit.

13. The method of claim 1, further comprising:
utilizing a predetermined movement profile for the at least one transport unit;
moving the at least one transport unit according to the predetermined movement profile;
utilizing parameter estimation to determine at least one system parameter value of a model of the control system;
collecting the at least one system parameter value over time; and
determining, from a variation of the at least one system parameter value over time, a wear condition of the at least one transport track or of the at least one transport unit.

14. The method of claim 13, further comprising:
determining a set stator current ($i_A$) for at least one driving coil of the plural successively arranged driving coils;
utilizing the model of the control system when calculating a stator current of the at least one driving coil; and
minimizing an error between the determined set stator current ($i_A$) and the calculated stator current by varying the at least one system parameter value of the model of the control system.

15. The method of claim 1, further comprising:
implementing a pilot control that acts on an input of the driving coil controller.

16. The method of claim 15, wherein the driving coil controller comprises:
a speed controller with a speed input; and
a pilot control that calculates a speed pilot control ($v_{vs}$), wherein the speed pilot control ($v_{vs}$) acts on the speed input.

17. The method of claim 15, wherein the driving coil controller comprises:
a conversion block with a force input; and
a pilot control that calculates a force pilot control ($F_{vs}$), wherein the force pilot control ($F_{vs}$) acts on the force input.

18. A method for operating a long stator linear motor by moving at least one transport unit along at least one transport track having plural successively arranged driving coils arranged along the at least one transport track, the method comprising:
controlling each of the plural successively arranged driving coils with a control system including a driving coil controller,
wherein the driving coil controller sets control variables (StG) for driving coils of the plural successively arranged driving coils that interact with the at least one transport unit, and
wherein said control system is configured to:
superimpose the control variables (StG) with an excitation signal (AS) having a predetermined frequency band;
determine actual variables (IG);
determine a frequency response from control variables (StGAS) superimposed with the excitation signal (AS) and the actual variables (IG);
determine control parameters (RP) from the frequency response; and
control movement of the at least one transport unit along the at least one transport track based on the control parameters (RP).

19. A method for operating a long stator linear motor by moving at least one transport unit along at least one transport track having plural successively arranged driving coils arranged along the at least one transport track, the method comprising:
controlling each of the plural successively arranged driving coils with a control system including a driving coil controller,
wherein the driving coil controller sets control variables (StG) for driving coils of the plural successively arranged driving coils that interact with the at least one transport unit, and
wherein said control system is configured to:
superimpose the control variables (StG) with an excitation signal (AS) having a predetermined frequency band;
determine actual variables (IG);

determine a frequency response, via an evaluation unit, from control variables (StGAS) superimposed with the excitation signal (AS) and the actual variables (IG);
output, from the evaluation unit, control parameters (RP); and
control movement of the at least one transport unit along the at least one transport track based on the control parameters (RP).

* * * * *